Patented Jan. 13, 1931

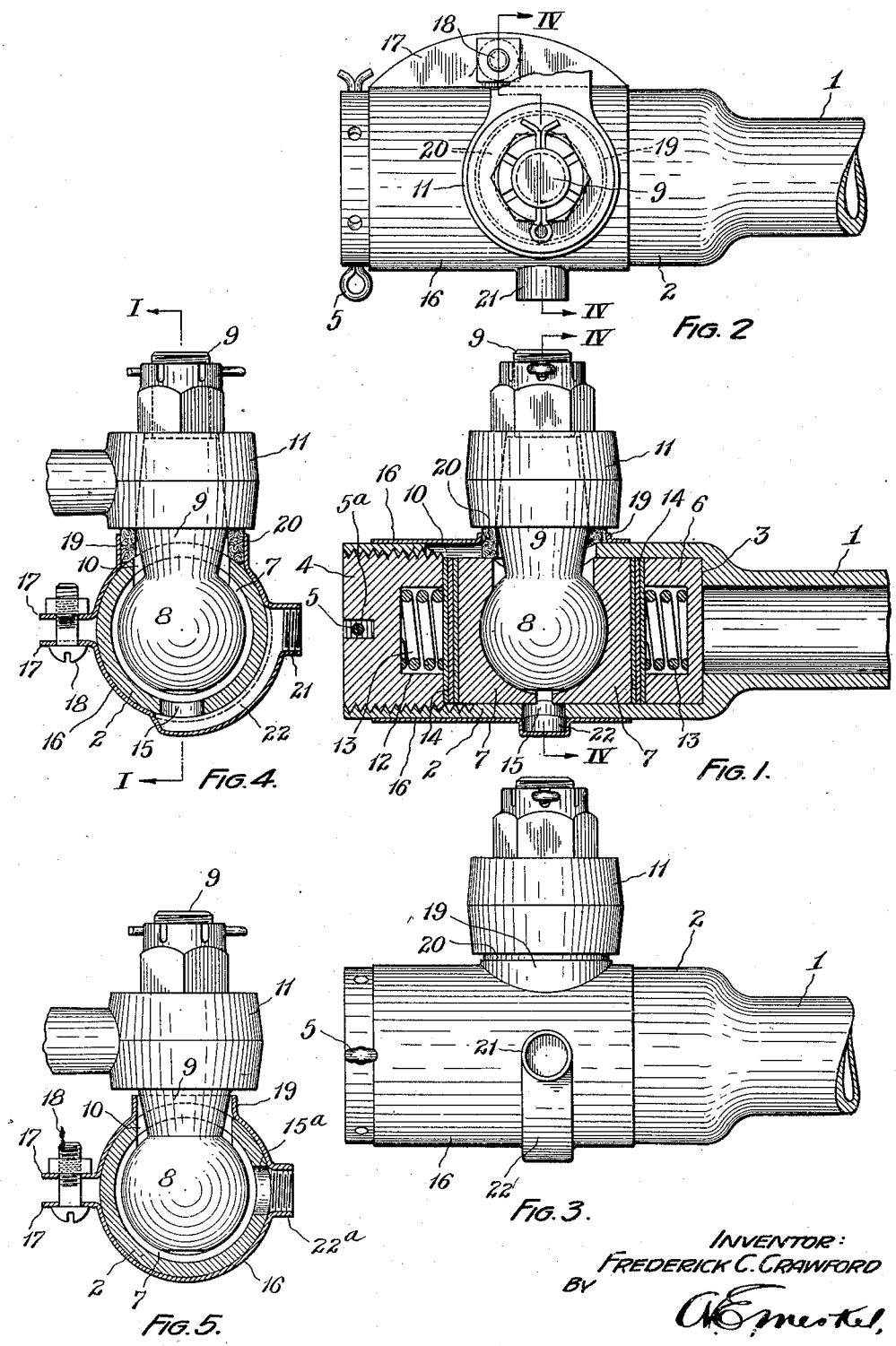

1,788,381

UNITED STATES PATENT OFFICE

FREDERICK C. CRAWFORD, OF DETROIT, MICHIGAN, ASSIGNOR TO THOMPSON PRODUCTS INC., OF CLEVELAND, OHIO, A CORPORATION OF OHIO

DUST COVER FOR TIE-RODS OR THE LIKE

Application filed December 19, 1925. Serial No. 76,452.

The invention relates to rod joint couplings, and more particularly to provisions for preventing the entrance of dust and dirt into a universal joint employed at the ends of tie rods and drag links used in automobile steering mechanisms, or in other places, and to provisions for convenient lubrication of such joints.

The object of the invention is to provide means of simple construction, easily manufactured and handled, which may be secured about the tie rod end and joint, and which will effectively seal the joint against the entrance of dust and dirt and provide means for effective lubrication thereof.

The invention consists in the novel construction and arrangement hereinafter described and illustrated in the drawings. The invention is capable of embodiment in various forms and combinations, but the best form which I have thus far contemplated is shown in the annexed drawings and which I shall now described.

Referring to the annexed drawings:

Figure 1 is a vertical longitudinal section through a rod end and ball joint with my attachment applied thereto on the line I—I of Fig. 4;

Fig. 2 is a top plan view of the construction shown in Fig. 1;

Fig. 3 is a side elevation of the construction shown in Fig. 1;

Fig. 4 is a vertical transverse section through the ball joint on the line IV—IV of Figs. 1 and 2;

Fig. 5 is a vertical transverse section of a modification through a line corresponding to line IV—IV of Fig. 1.

This invention is not concerned with any particular form of ball joint, except with respect to certain features thereof, as will later appear, but I have disclosed herein a particular construction of ball joint for the purpose of clearly disclosing the relation of my attachment thereto, and I will briefly describe the ball joint as shown in the drawings.

A rod 1 of tubular construction is provided with an enlarged cavity at its end, which forms a ball joint housing 2 for the ball joint, an annular shoulder 3 being formed at the inner end of the cavity. The outer end of the cavity is closed by an externally threaded retaining plug 4 which takes into the internally threaded end portion of the rod. This plug is held in any desired adjusted position by any suitable means, as illustrated in the drawings, by a cotter pin 5 which passes through openings in the end of the rod and through a kerf 5ª in the outer end of the retaining plug. Within the inner end of the housing 2 the base of a coil spring retaining cup 6 rests against the shoulder 3. Between the retaining cup 6 and the inner end of the retaining plug 4 are two ball seats 7 which have spherical segmental bearing surfaces engaged by the ball 8 of a ball stud having a shank 9 extending through an opening 10 in the wall of the ball joint housing, which shank is engaged by a member 11 of the part to which the rod 1 is to be connected. The inner end of the retaining plug 4 is provided with a recess 12 in which is seated a coil spring 13 bearing against the bottom of the recess at one end and exerting pressure on the adjacent ball seat 7 to press it into engagement with the ball 8. A like spring 13 is seated in the retaining cup 6 at the inner end of the ball housing and exerts pressure on the adjacent ball seat 7 with like effect. If desired for purposes of original adjustment, or for the purpose of taking up undue wear in the ball joint, one or more shims 14 may be inserted between the bases of the ball seats and the adjacent parts. Through the wall of the housing beneath the ball stud there is a lubricating passage 15 through which a lubricant is forced into the ball joint.

It will be apparent that, in a joint of the character above described, dust and dirt would enter the ball joint unless the opening 10 were suitably covered and protected from the entrance of such foreign material. It is the purpose of this invention to provide such protection and also to provide simple means for effectively lubricating the joint without material modification of the rod. The means adopted for this purpose will now be described.

A split sleeve 16, preferably of metal, surrounds the ball joint housing, being made to conform to the surface thereof, and is provided at its split edges with apertured flanges 17 adapted to receive clamping bolts 18 by means of which the sleeve may be firmly clamped to the ball joint housing. In the wall of the sleeve is an opening bounded by a flange 19 adapted to receive an annular washer 20 which, when the parts are assembled, passes about the shank of the ball stud 9 and rests between the ball joint housing and the connected part 11 effectively to close the opening through which such shank passes.

In the form shown in Figs. 1 to 4, a lubricant inlet nipple 21 is formed in the side of the shield about 90 degrees from the washer retaining flange, from which nipple extends a groove 22 to a point just below the lubricating passage 15 in the bottom of the ball joint housing. Into this nipple is inserted any known valve or grease cup suitable for supplying a lubricant. It is obvious that when grease or oil is forced through this nipple it will pass down through the groove 22 and into the passage 15 to the ball joint, whereby the latter is effectively lubricated.

From the above description it will be apparent that I have provided a very simple attachment to a joint of the character above described, whereby the joint may be lubricated and the opening adapted to permit the insertion of the ball and the ball stud is effectively closed against the entrance of dust and dirt.

I have shown a modification of the lubricating passage in the sleeve and ball joint housing in Fig. 5 in which the lubricant conveying groove 22 is omitted. In this case I provide the sleeve with a nipple 22ª positioned in alinement with an opening 15ª in the wall of the ball joint housing. By this means the lubricant will be admitted to the side of the ball joint instead of at the bottom thereof. Otherwise the attachment is the same as that shown in Figs. 1 to 4.

While I have described specific details of the best form of the invention now known to me, it is obvious that the parts may be varied greatly in structure, and that different features thereof may be used with other features which may differ greatly from those shown. It is therefore to be understood that the invention includes all structures comprehended within the terms of the appended claims.

What I claim is:

1. As an article of manufacture a combination dust cover and lubricant conveyor and retainer for universal ball joints comprising a metallic member of substantially cylindrical shape and adapted to encircle the ball joint housing and be secured thereto and having a flanged washer retaining opening therein, a lubricant inlet therebelow, and a lubricant conveying groove extending from said lubricating inlet.

2. In a ball-joint for a tie-rod end, in combination, a ball-joint housing having an opening in its wall, a ball-stud seated in the housing and having a shank extending through said opening, a lubricant-receiving opening in said housing to admit lubricant to the ball-joint, a dust cover and lubricant-retainer consisting of a metallic member surrounding the housing having a flanged opening surrounding the shank of the ball-stud, and an annular washer seated in said opening to exclude dust from the ball-joint, said dust cover having an independent opening communicating with the lubricant-receiving opening in the housing.

3. As an article of manufacture, a lubricant attachment for bearings comprising a split sleeve shaped to fit the outer contour of a bearing housing, and means for securing the portions of said sleeve adjacent the split therein together, said sleeve having a lubricant opening and a lubricant conveyor groove in communication with said opening and extending about the periphery of the sleeve.

4. As an article of manufacture, a lubricating attachment and dust cover for bearings, comprising a metallic sleeve-like shell shaped to fit the outer contour of a bearing housing, and completely enclose the joint therein, said shell having a lubricant opening and a lubricant conveyor groove extending about the periphery of the sleeve.

5. As an article of manufacture, a combination dust cover and lubricant conveyor and retainer for universal ball joints comprising a substantially cylindrical member shaped to fit the ball joint housing and completely enclose the joint therein, and having an opening therein for the passage of the shank of the ball stud, said member having a lubricant conveyor groove formed therein, the groove extending about the periphery of the member.

Signed by me this 25th day of November, 1925.

FREDERICK C. CRAWFORD.